US009471906B2

(12) United States Patent
Samid

(10) Patent No.: US 9,471,906 B2
(45) Date of Patent: Oct. 18, 2016

(54) DIGITAL TRANSACTIONAL PROCEDURES AND IMPLEMENTS

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 14/035,921

(22) Filed: Sep. 24, 2013

(65) Prior Publication Data
US 2015/0088721 A1   Mar. 26, 2015

Related U.S. Application Data

(60) Provisional application No. 61/744,277, filed on Sep. 24, 2012, provisional application No. 61/724,916, filed on Nov. 10, 2012.

(51) Int. Cl.
  *G06Q 20/06* (2012.01)
  *G06Q 40/04* (2012.01)

(52) U.S. Cl.
  CPC ............ *G06Q 20/065* (2013.01); *G06Q 40/04* (2013.01)

(58) Field of Classification Search
  CPC .. G06Q 20/36; G06Q 20/341; G06Q 20/352; G06Q 20/353; G06Q 20/367; G06Q 20/40145; G06Q 30/0207

USPC .......................................................... 705/37
See application file for complete search history.

(56) References Cited

U.S. PATENT DOCUMENTS

| | | | | |
|---|---|---|---|---|
| 2004/0171406 A1* | 9/2004 | Purk | ...................... | G06K 7/006 455/558 |
| 2007/0215689 A1* | 9/2007 | Algiene | ............... | G06Q 20/367 235/379 |
| 2007/0244812 A1* | 10/2007 | Turk | ....................... | G06Q 20/02 705/39 |
| 2008/0262969 A1* | 10/2008 | Samid | .................... | G06Q 20/04 705/64 |
| 2010/0088231 A1* | 4/2010 | Eugenio | .................. | G06Q 20/28 705/44 |
| 2012/0239580 A1* | 9/2012 | Al-Herz | .................. | H04L 9/321 705/75 |

* cited by examiner

*Primary Examiner* — Kirsten Apple
*Assistant Examiner* — Michael W Anderson

(57) ABSTRACT

This invention describes a set of related procedures designed to co-operate with mints of digital money in order to allow for said money to be properly, securely, and conveniently traded by, various size and various type of trading crowds. The procedures refer mainly to distribution of responsibility. This invention also specifies the construction of digital coins encapsulated in a physical housing to amount to off-line tradable digital coins.

9 Claims, 5 Drawing Sheets

Figure 1:
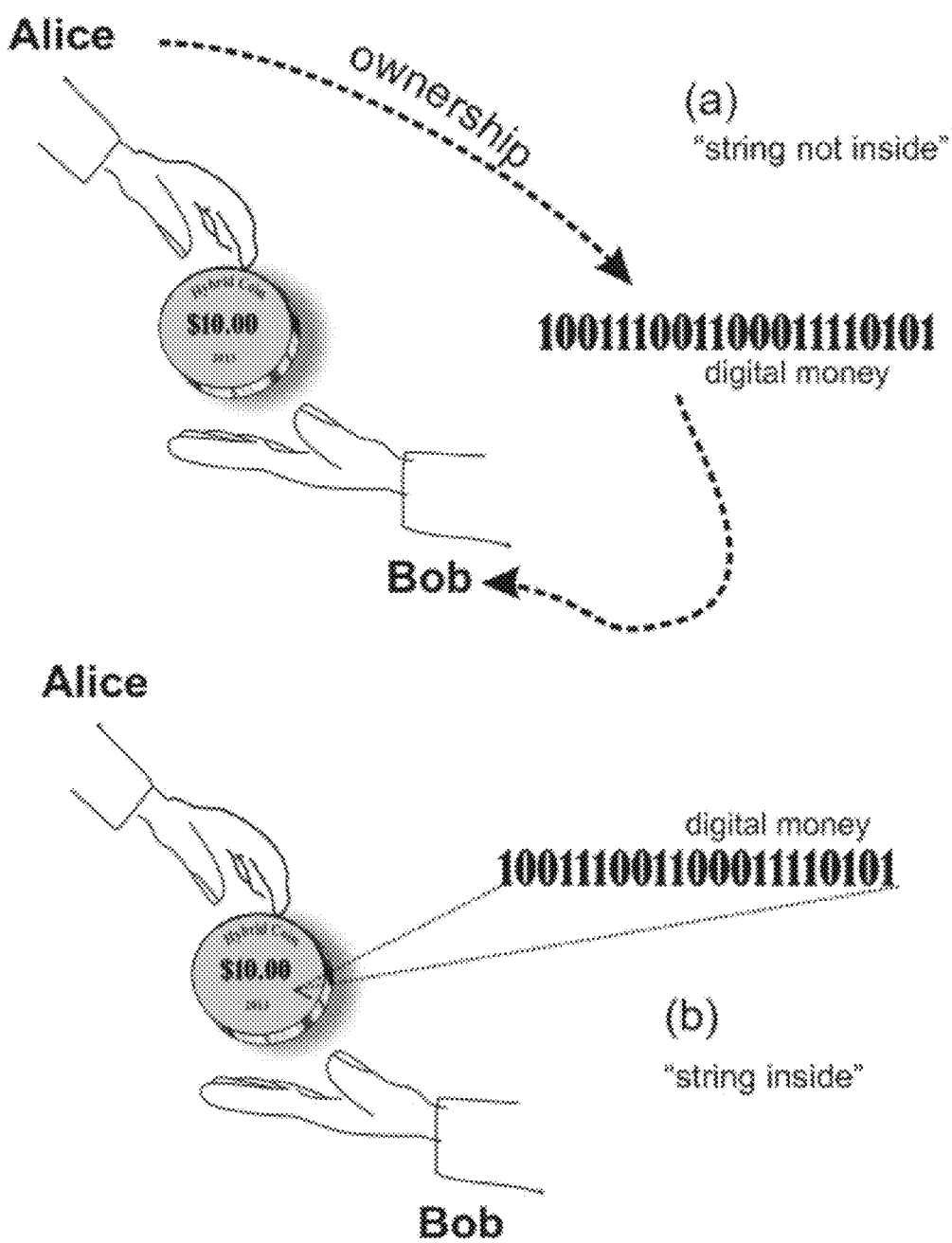

Anatomy of Hybrid Coin Payment Environment appearance of a hybrid coin

Hybrid Coins "NUT" Design

CAP Part     USB Heart Part

"NUTS" chained together

"NUTS" attached front to rear for combined reading:

Cracked Hybrid Coins

DIGITAL TRANSACTIONAL PROCEDURES AND IMPLEMENTS

CROSS REFERENCE TO RELATED APPLICATIONS

This application claims as priority date provisional applications filed by the same inventor: (1) Application No. 61/744,277 filed on Sep. 24, 2012 entitled: "Innovation Package G29" and (2) Application No. 61/724,916 entitled "Hybrid Coins" filed on Nov. 10, 2012. It also claims as reference U.S. Pat. No. 8,229,859.

THE NAMES OF THE PARTIES TO A JOINT RESEARCH AGREEMENT

None.

INCORPORATING BY REFERENCE OF MATERIAL SUBMITTED ON COMPACT DISK

None

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Field of the Invention

Digital Money

The newly emerging digital money mints require a careful design and construction of procedures and implements to allow for the digitally minted money to spread into the hands of the trading public. Such procedures and implements are the subject of this invention.

In today's practice only about 11% of traded money is reduced to coins and paper bills. The balance of 89% is computerized trading. The prevailing 'computerized' form of representation of money is via a string of symbols that represents a number: (e.g. $34.60). This string is kept in a computer storage location. The number that represents money value has no identity to it. Namely, it indicates value only. By contrast, a one dollar bill indicates value ($1.00), and also is marked with a serial number that gives this particular bill its unique identity. Someone can erase the number $34.60 from a storage place, and then write it again, and there will be no indication of the erasure and rewrite. But if someone takes a $1.00 bill away, and provides another instead, then the new bill will have a different serial number and the switch will de discovered. Now, the new technology of digital currency allows one to use computers to represent value through a digital string (bit string), and have that value associated with a unique identifier, sort of a computerized serial number. This fundamental change in the representation of money allows for a new range of transactional applications. This invention refers to (i) trading protocols with digital money, and to (ii) means to trade with digital currency off-line—using hybrid coins—physical devices that carry bit strings that represent money value and bill identity.

BRIEF SUMMARY OF THE INVENTION

Previous inventions (e.g. U.S. Pat. No. 8,229,859) have established digital money minting capabilities. Such digitally minted money needs to be engineered for efficient transactions. This invention addresses a host of complementary procedures and implements designed to facilitate effective, smooth, and trouble-free exchange of digitally encoded transactional value.

The invented procedures and implements may be categorized into two broad categories: physical transactional coins, referred to as Hybrid Coins, and Mint operation exchange, where a core mint interacts with front mint so that in combination the various mints and digital money management center can efficiently implement the digital formula and the particular solution that is being used to construct a safe and effective digital currency (e.g. BitMint designed on the basis of U.S. Pat. Nos. 8,229,859, and 6,823,068).

The hybrid coins are constructed for various denominations, for various safety options, and for various transactional environment. Essentially to the various coins is the electronic storing of the digital information of the coin, so that it is clear to its receiver that the coin is "virgin"—its digital content was never exposed, and hence could not have been redeemed earlier, and otherwise, same digital content is engineered for uploading online to effect due redemption.

The mint arrays in this invention offer a variety of responsibility distribution between the core and front mint so that various financial and trading conditions cam be efficiently addressed. In particular the ultimate responsibility to redeem bona fide digital money may be vested in the core mint or in various of the front mint, and perhaps in some combination.

Taken together these invented procedures and implements provide for an effective implementation of the newly invented digital money solution, and their smooth and convenient deployment in a variety of trading situations.

DETAILED DESCRIPTION OF THE INVENTION

The invention is described in two parts:
1. Mint Array Design (Core Mint v. Front Mints)
2. Hybrid Coins 1. Mint Array Design The Core BitMint projects to any number of front BitMint entities, and the relationship may be one or a mix of the following:

Royalties Payment
System
Dead Coins
Live Coins

Each front mint may take the role of the Core, and project to its own front entities. In this way one may define a mint-tree (hierarchy).

This relationship will allow front mint to be consistent with parameters and regulations prevailing in their domain, while enjoying technical and functional support from the Core BitMint.

Royalties Payment:

In this mode Front BitMints pay use royalties to the Core for using its technology, and no further relationship or obligation exists.

System:

In this mode the Core delivers, installs, and provides training and maintenance to the front—or any part of this list. In its full implementation the Core provides a ready-to-mint system, maintains it, and trains its operators.

Dead Coins:

In this mode the Core delivers to the front valueless minted-coins per the front request. The front would then 'charge' these dead coins, and 'bring them alive' versus its customers. It would be the Core responsibility to insure the integrity of the bits and their identity, and to equip each coin with the headers and trailers as needed. The Core would identify the core mint, the front mint, any other parameters requested by the front, and then add, say, as trailers, any cryptographic parameters as needed.

Live Coins:

In this mode the Core will deliver live, charged coins to the front mint. The front mint will pay, or promise to pay for these live coins, and then, if necessary, process these coins to serve for the purpose of the front.

The responsibility and involvement of the Core with the business of the front entities is minimal in the royalties mode, a bit greater but still limited in the system mode, also limited in the dead-coins mode, and the highest in the live-coins mode.

In the system mode the Core is responsible for the integrity of the delivered system, but not for its use. In the dead-coins mode, the Core is responsible for the quality of the bit identities of the coins, but not for its money value or use. In the live-coins mode the Core is responsible for the money value of the coins. This responsibility may be of two categories:
front-limited
front-extended In the front-limited mode the Core has a contract with the front whereby the front pays or promises to pay for the delivered coins, and the Core agrees to redeem these coins when submitted by the front for redemption. The Core will not be involved in any business arrangement between the front mint and its customers, and will not interact with those customers. In the front-extended mode the Core will interact with the customers of the front, even directly redeem its coins to them.

Basically, the idea of live coins, is to alley the customers apprehension with regard to the trustworthiness of the front mint. The live-coins setup will give the front customers the peace of mind that their money is kept the trustworthy Core.

For example, customers may be reluctant to trust their money to an unknown Front company that offers them money transfer, micropayment, charity contribution, etc. However, if the terms of the coin are such that if the Front does not pay, or goes out of business, the coin can be redeemed at the Core.

Buffer: Layered Mint Operation

It may be advisable to construct a buffer between the entity that mints the coins and the entity that trades them with the public (its customers). Such in the case in the "live coin" Core-front business setup. A buffer will allow a Core mint to mint coins that may either be traded as is by the front mint (in this case this entity is not much of a mint), or it may be first processed by the front mint, with both the header and trailer possibly adjusted, added-to, to serve the purpose of the front. The value bits will be minted by the Core based on the Core's recognized trustworthiness. For example the front could add cryptographic parameters to the trailer.

Illustration: the add-on header information (added by the front) will include payment terms according to which the Front will redeem the coin in favor of its customer. The trailer add-on may contain a signed hash to identify the coin as re-minted by the Front.

Bit-Masking Trade Tracing

This procedure is based on the notion that a BitMint coin is constructed from a large number of ordered bits. So much so that anyone who knows the identity of, say, 80% of the bits is not likely to have guessed it right but is overwhelmingly likely to have been given the bits. Accordingly Alice could pass a BitMint coin to Bob, and mask the identity of a small number of bits, say, selected randomly. Bob will have knowledge of the identity of sufficient number of bits to claim that he is in possession of the coin, but the identity of the masked bits will connect Bob to Alice, as the payer of the coin. If Bob had received the coin from Carla, then it is virtually impossible for Carla to randomly select the very same bits as Alice for the purpose of masking their identity as she passes the coin to Bob. Hence the identity of the masked bits points to the source of the coin. Bob, on his part may pass the coin to David—masking some additional bits. The identity of the bits that Bob masked will point to him as the source of the coin. And so on, when David passes the coin to Eve he masks some more bits. And on it goes. If Alice will examine a coin held by Eve she will be able to determine that it was a coin she held because the bits that she masked giving the coin to Bob are all masked. And since the number of masked bits is so small compared to the number of bits in a coin, the chances that all of Alice masked bits are masked by someone else are very slim.

The selection of bits to mask may be done via a selection algorithm that takes into consideration any information on the coin, its value bits and all the other coin information (header and trailer). So for each coin the selected bits are different, but given a coin the selection algorithm may be readily replayed.

If an approval hierarchy is used then it is advisable that the number of masked bits is smaller than the number of masked bits between layers on the approval tree.

Samid Cipher RFID

Samid cipher U.S. Pat. No. 6,823,068 may lend itself to RFID technology. The key may be hard-wired as matrix of bits where every two bits represents one of the four letters: X, Y, Z, and W. The cipher will operate on basic knowledge where the plaintext comprised of a non-repeat series of X, Y, Z and W letters guides a traveling path on the key, and produces a traveling trace marked as a sequence of Up, Down, Right, and Left. The stream comprised of U, D, R and L letters will constitute the ciphertext. The plaintext may be hard-wired, firmware, or software. Upon triggering from the outside the plaintext will be fast processed through the key (the matrix) to yield the ciphertext as output. Conversely, the ciphertext may be resident in the RFID, and upon initialization, the ciphertext will be processed via the key (the bit matrix) to yield the plaintext as output. In both cases the Samid cipher will be implemented.

There are various uses for this arrangement:

Hiding content of the RFID: an RFID tag may contain information that needs to remain private. In a regular ID any reader would activate the RFID and read the information in it. That information may be encrypted and be interpreted through an exhaustive look-up table. But an easier alternative is to fit the secret RFID information as software, firmware or hardware in the tag, and refer to it as plaintext. The Samid key will such that the size of the output ciphertext will be much larger than the size of the plaintext. And also there will be a great deal of degree of freedom for the encryption process to yield any of a large variety of ciphertexts, all of them decrypt back to the same plaintext, if the decrypter has possession of the right key.

So, in this arrangement only the key will have to be known to the reader of the RFID, and a large number of related or unrelated RFID tags will be sharing the same key. Each tag will contain some specific and unique content. Upon activation, reading, the content will be processed through the Samid cipher key, and yield an output to be read by the decoder/reader. The reader will have the key in its reading device, and will be able to instantly decrypt the ciphertext, and display and interpret its contents. An unauthorized reader, will activate the RFID, but will be unable to interpret its output because of not having the key.

What is more: the size of the ciphertext will vary, and so the hacker will not be able to conclude from the size of the ciphertext, how much contents (plaintext) is stored in the device. Also the activation will be able to include random data from a clock or from the environment, and that data will guide the encryption each time to a different ciphertext, a further difficulty for the cryptanalyst.

Similar setup could be done with Flash technology. A flash memory may contain a content X (may be a digital money string or anything else). The device that holds this memory card, activates the device, so that X is encrypted via a well defined firmware, say key, and produces Y. A verifier attests to the presence of X in the drive on account of detailed examination of Y.

Autokey Authentication

Alice holds string X, and wishes to signal and prove that holding to Bob. If she sends X in the clear, Eve, the eavesdropper will catch it. If she had a shared key with Bob she could use it to encrypt X and send it to Bob. Otherwise she could use diffie Hellman or any other cryptography between strangers—with all the weaknesses thereto. So instead she could use an Auto-Key, based on the crypto-cipher and crypto addition presented by this inventor before. Accordingly Alice will separate from the string t bits as described in the crypto cipher, use these bits to find where to dissect the rest of the string, and then use one part so dissected as plaintext and the other as a Samid cipher key. Then Alice will encrypt the plaintext using her derived key applying the Samid cipher. She will communicate the result to Bob the verifier. Bob who knows X will repeat Alice process to check if Alice ciphertext agrees with his calculations, and if so, he is rest assured that Alice has X. This verification happened without any exchange of any key. Eve, the hacker will not be able to reverse Alice ciphertext, Y to the original string because as it has been shown there, there are infinite number of strings that process to the same Y.

2. Hybrid Coins: Off-Line Digital Money

Digital money is native to online applications, and inherently problematic in off-line circumstances where one suspects that the same digital string was used earlier, elsewhere, or even later, putting the payment in doubt. We propose effective means to manage such risks and operate a viable off-line digital payment solution. The central concept is that of a 'hybrid coin' or say, a 'dynamic coin'—a physical device containing, dispensing, and in some cases, accepting digital cash. The device, the coin, will be tamper-resistant to a degree commensurate with its capacity. Security will be safeguarded by insuring that the cost to counterfeit exceeds the maximum money content of the coin. Different coin denominations will have different tamper-resistant measures, and these measures will be dynamically adjusted to protect against increasingly more sophisticated counterfeit measures. The use of the coins will be either via the regular hand-over, or by 'draining': namely, one could pass to the payee a bunch of coins trusted for their declared money content, or one would connect the coin to a recipient device, and drain, pay off a portion of the stored value. We distinguish between the following coins: (1) "gold coins" which are minted by digital currency mint, and their seal is intact, indicating they were never bled, drained, and hence satisfying the recipient that these coins carry their nominal (mint stamped) value. (2) "silver coins" which are gold coins that have been partially used (drained), and now contain less money than the originally minted amount. (3) "bronze coins" which have been drained, or bled, but which have also be replenished from another coin. The coins are optionally battery operated, marked by a unique serial number, and they may be shaped like regular coins. The digital money in the coins can be defined in terms of dollars, Euros, Yuan, or any other currency, as well as defined against gold, or any other commodity valuable. Hybrid coins may be uploaded to online use, and altogether facilitate an important facet of normal civil trade practice. Hybrid coins provide continuity of habit relative to regular coins, and respond to every day functionality needs. Hybrrid coins may also be found useful in mass emergencies, when power lines are down, communication networks collapsed, and off line payment is the only way.

Introduction to Hybrid Coins

There are several solution options for online digital money. Yet to prevail in the marketplace it seems necessary for a solution to be extendible to off-line circumstances. For centuries people have been paying each other by handing over a physical token, a representative of value. For behavioral continuity this is a must. In practice there are two categories of situations where the off-line payment option is critical: (1) immediacy and simplicity, and (2) emergency—short-lived, or durable. Nothing electronic, or computer-based can compete with the immediacy and simplicity of hand to hand coin transfer. In many daily circumstances resorting to an electronic gadget, having to punch buttons, and having to participate in a person-machine dialogue, is too much of a burden. Electronic transactions inevitably rely on electric power supply: be it a battery, or be it the grid. Both may be interrupted, impaired and become dysfunctional—disabling payment altogether. Our modern societies are comprised of very crowded urban areas where millions of strangers share a territory and public resources, and a payment mechanism is the only way to get such a crowd into a mutually beneficial cooperation. We cannot risk the loss of the payment option, exactly when it is needed most.

We conclude then that we must allow for a seamless back and forth motion between the online payment mode and the offline payment mode, and the concept of Hybrid Coins proposes a solution for this challenge.

Let us first define and characterize digital money.

Digital Money is money that expresses its value via digitized data in a medium-un-tethered fashion. Since all data can be reduced to an equivalent binary string, we can further narrow the definition to say that digital money is money that expresses its value via a bit string, or, say a 'binary string' where the identity of the string bits $\{0,1\}$ carries the monetary value regardless of the medium through which these binary digits are written or expressed.

The logic, mechanism algorithm or concept that associates a given binary string with a monetary value is of no importance for our matter herein. A hybrid coin should extend to off line payment any digital money solution where a bit string represents value, regardless of the concept, formula, logic, mechanism that establishes the value of the string.

The Hybrid Coin Concept

A hybrid coin is a physical device that by handing it over, one carries out a payment corresponding to the face value of this device, where the face value is reflected by a bit string that changes ownership from the payer to the payee as the coin is handed over. Ownership is expressed as 'the right to use, dispose, pass-on this string as the owner sees fit.

According to the above definition the bit string—the digital money—does not have to be inside the coin, or passed along with the coin. All that is needed is for the ownership of the associated bit string to be exchanged between payer and payee. Obviously, if the coin contains the string, the ownership passes on. In the "no-string-inside" option the coin may serve as "proof of ownership" which can be used in some subsequent protocol in which the money is actually transferred. FIG. 1(a) depicts the "no string inside" option, and FIG. 1(b) depicts the "string inside" option.

In FIG. 1(a) "no string inside: Alice passes to Bob a $10.00 hybrid coin, and this act confers a transfer of ownership of a bit string that resides in the clouds of elsewhere outside the coin. As the coin is transferred from Alice to Bob, the respective ownership of the corresponding bit string is also passed from Alice to Bob. Passing the string from Alice to Bob, does not necessarily erase the string from Alice memory. This leads to the fundamental issue of double spending, namely Alice, by mistake or by fraudulent intent may re-transfer ownership to the same bit string to a third person, thereby violating the association between the bit string and the socially accepted sense of value. Since the bit string represents value in the context of some comprehensive solution to digital currency, we may assume that the issue of double spending is resolved and taken care of in the context of that solution.

FIG. 1(b) "string inside" represents the case where the physical device, the hybrid coin, contains the digital money, and hence, the passing of the coin amounts to passing the string—the money itself.

A string-inside hybrid coin is produced and manufactured, and also optionally distributed by an entity referred to as the mint. The mint assumes the responsibility to the monetary value of the coin it issues, mints.

In addition to the standard hybrid coins described above the mint may wish to construct: (1) empty coins, and (2) networked coins. Empty coins are simply bit-money containers that may be filled with bit-money by traders to dispose of them at a later time either by feeding their bits to a payee or by passing the coin to a trusting payee. Networked coins are hybrid coins with a phone-like connection to networks. Such "live hybrid coins" may have their contents instantly, and continuously verified by the continuously connected mint.

String Inside Hybrid Coin

The string-inside case may be categorized as follows: (1) Gold coins: a pristine, virgin coin that has not been broken-into, meaning not 'opened', nor tampered with, relative to the state in which it was issued by the mint. (2) Silver coins: a gold coin that has been worked on, and its inside money string was at least partially exposed; (3) bronze coins: a silver coin to which a money bit string has been inserted from a source other than the mint.

Gold coins are transacted on account of the evidence of the authenticity of the declared mint, and on account of their virginity, namely by convincing the payee that the handed-over coin has not been tampered with since it was minted, and hence its declared face value is inside the coin with the full faith of credit attached to the mint itself. The evidence of virginity may be 'self evident'—judged by simple visual inspection, or it may be instrument based—verified by a testing device relying on scientific principle that is used by the coin. A combined measure is also possible.

A silver coin may be totally drained, and hence worth nothing, or it may be partially drained, and in that case a reader may be needed to establish its residual value, and confirm that the digital money still there is indeed the original money put there by the mint, and not a refill from an unknown source.

A bronze coin will also need a reader to read the digital money residing in the coin, but in addition the payee will require means to authenticate the present string as its source may be questionable.

Silver coins must be born from gold coins, and 'give birth' or transform into bronze coins, but bronze coins don't have to have silver status ancestry. A trader could construct his own bronze coin, and fill it with digital currency on his or her own. If the coin is characterized and identified as 'bronze' then the recipient would not care whether the coin originally was a gold coin, or it started as a bronze status. The security implications are the same. The mint might issue 'empty coin'—which are essentially empty containers for digital currency, expecting the trader to fill us these containers on his or her own. In this case the mint will have no liability as to the ill use of such coins by fraudsters.

The reader of contents for each hybrid coin may be built into the coin, and the result is electronically computed in the coin itself. In that case the present value of the coin may be communicated electronically to an electronic device with which the coin communicates, and/or it may be displayed on the coin for the payee to read without any instrument. The reading circuitry of residual value will have to be trustworthy and tamper resistant.

String not Inside Hybrid Coin

In this mode possession of the coin, once verified by the authority that manages the bit money string, will be declared as given to the holder of the coin. When the coin holder passes the coin further to a subsequent trader then the string management authority reconfirms the new holder of the coin, and registers the new possessor of the coin as the new owner of the string. A bit money string owner can redeem it, or download it, or dispose of it as he sees fit according to the operating rules of the mint.

"String not inside" may be operated mainly with gold coins. The monetary value of the string-not-inside must be commensurate with the security and trustworthiness of the technology that is used to confirm the possession of the hybrid coin that is associated with the particular string.

The advantage of the 'string not inside' mode is that payment may be conditional. A 'string inside' coin, say denominated for $100, will allow the holder of the coin to trade it as a physical object for its nominal $100 value, and will allow him to break it open, suck out its bits and use them as un-tethered cash. A 'string not inside' gold coin for the same denomination, would be clearly marked with a payment code, or say a payment condition code that would indicate to the recipient that this coin does not contain money per se, but its possession will allow one to claim the denominated sum if, and only if a set of conditions indicated by the marked code is fulfilled. The recipient then will accept the coin as a gold coin for its nominal value, if he can satisfy the payment conditions indicated by the code. (Or, if he or she believes they can trade it further to a complying recipient). The possessor of a gold 'string not inside' coin may break it up, connect it electronically to the mint—prove to the mint that the respective coin is in his possession, and when so, the mint will demand prove of satisfaction of the other payment conditions, and upon a satisfying proof, the mint will communicate the denominated sum to the claimant.

So for our $100 'string not inside' coin, once broken-in and hooked through a phone to the mint, the mint might launch a challenge-response dialogue with the coin. The coin will be tamper resistant and have a chip inside with unique data and logic to satisfy the challenge-response dialogue issued by the mint. The mint will then be satisfied that the particular coin is in possession of the claimant, and will then ask for a proof that the claimant belongs to, say, a club, by asking for a club membership PIN to be communicated to the mint, or to be demonstrated for having possession of the PIN using a challenge-response dialogue. And only when the two conditions are met, the digital money worth $100 is sent down the electronic channels for the claimant to use as cash.

Technology of Hybrid Coins

We discuss the following technological challenges:
Mint Assurance
Virginity Assurance
Silver and Bronze Coins Value Determination
Construction technology In each case the technology will have to correspond to the denominated value of the coin, aiming to insure that the cost to counterfeit or violate the coin will be at par or more with its denominated value. Coins with large denominations will allow for more expensive technology.

Unlike the case with ordinary coins, hybrid coins allow the mint to (1) monitor counterfeit activity, and (2) effectively fight it strategically. Coins may be minted with a built-in expiration date. By that date the coin will have to be cracked open, and its content redeemed. This will expose the number of coins that circulate while being counterfeit. Also, if a major counterfeit action happens, the mint can wholesale invalidate the type and denomination of the violated coin, and ask owners of such coins to redeem them electronically by breaking them up, and testing the validity of the money within. This can be done in combination with a strategy of manufacturing the coins with expensive machines that become economical only for large quantities. Counterfeiters will also have to invest in expensive counterfeit machinery, which will become useless the moment the mint invalidates that type of coins.

Mint Assurance

Traders need to be assured that the coin they trade with was manufactured by the mint, and not by a counterfeiter. For that reason any hybrid coin will come embossed or written with a serial number, allowing a trader to verify the coin. Naturally verification will occur more frequently for high denomination coins. The mint will use technology to create confidence about its coins. The mint assurance technology will be of two kinds or combination: (1) visible measures, (2) device tested measures. The mint might use embossing, imprinting, type-casting, and exotic materials to make it difficult to copy and counterfeit. The higher the denomination, the greater the measures of visible uniqueness. The mint may also embed indicators that would require an inspection device to probe. The device tested technology might be based on electromagnetic phenomena, or on chemical reaction.

As an example the coin may be covered with color changing plastic that changes its color upon shining on it with a special range of electromagnetic radiation. This technology is used in sunglasses that become dark upon sunlight, and return to sheer status in room situation.

Various holographic techniques can be used to build a sophisticated coin that will frustrate amateur counterfeiters, and all others except top professionals, and will also require the counterfeiter to counterfeit only high denomination coins.

A simple mint assurance will be given by the serial number and minting date imprinted on each coin. A recipient trader will be able to text the serial number and date to the mint (or pass it on otherwise), and the mint will respond either with an authentication—yes, such a serial number corresponding to the sent date is a the serial number and a date of a valid coin. It is not a very good assurance, of course, but it has some base value.

One special way to provide mint assurance is the cryptographic window method. See below.

The above address the issue of mint assurance—assurance of authenticity of the coin as being issued by the declared mint—with respect to Gold coins. Once opened, broken-in, the assurance of the mint will be taken care of through the electronic exchange with the computing device that would be connected to the coin. There are various common cryptographic means to assure the validity of the declared manufacturer of a device. Such 'silver coin mint assurance' is a different challenge from the 'gold coin mint assurance'.

Cryptographic Window Mint Assurance:

This method is more attractive for high denomination gold coins. The gold coin is fit with a dynamic display window, LCD or similar display technology. The small display will feature some sequence of alphanumeric characters based on some cryptographic protocol. The recipient of the coin will communicate to the mint the serial number of the coin, and the current display string. The mint will respond with an OK, if the communicated display string is the expected one, and "not-ok" otherwise.

This crypto window may be implemented using any of the prevailing techniques used by hardware devices that compute keys, display them and change the display every 60 seconds or so. Such devices are used to authenticate a user to an approached bank, and they could also be used to authenticate a coin, especially of high denomination.

The coin so fitted will have two separate electronic circuitry. One is the circuitry that is used once the coin becomes silver, and is communicating value and money transfer with the hosting computing device, and the other circuitry will be for mint authentication as a gold coin status, with virginity intact.

The mint assurance circuitry can easily be implemented using hardware oriented cipher, like a typical LFSR stream cipher, or the cipher described in U.S. Pat. No. 6,823,068. Every so often the time count by a built in clock will be used as plaintext, and the corresponding ciphertext will be displayed on the crypto window. The coin recipient, or say, the coin verifier, will text the code to a mint number, and get a text back: OK, or not-OK, status because the mint will know from the serial number what is the tamper-resistant key in the coin and compute the corresponding display (ciphertext).

Any other mechanism where the coin will display a seemingly random display that changes frequently enough, will serve as a means to assure the identity of the mint.

Virginity Assurance

"Gold coins" must be traded with the confidence that they are 'virgin'—unopened, unused. Virginity may be based on basic old fashioned technology of 'scaratchable pads'. A simple heavy stock paper ticket will certify the denomination of the coin, and will feature a scratchable stripe. Upon scratching the stripe, the bar-coded digital coin will be exposed, and be entered via a bar-reader into a payment oriented electronic computing device. Once scratched it is clearly not virgin anymore, and no one would be fooled to regard it as such. This solution may be a bit inconvenient since it requires a bar code reader.

The pharmaceutical industry is using a variety of technologies to prove the 'virginity' of packages of medications. These wrappers etc. may be copied for assuring the virginity of coins.

Coins may be wrapped with a plastic cover fitted with a 'breaking line'. Upon a slight blow, like with a heavy book, or a small hammer, the plastic cover will break along the breaking line, and the virginity will be clearly lost. The coin exposer will then be able to connect the coin with a payment oriented computing device and use the money therein.

Silver and Bronze Coin Value Determination.

A silver coin will have to provide first mint assurance, and then "no bronze" assurance, namely assurance that the coin has not be refilled with bits, but that all the bits to represent money therein are originally minted by the mint. Mint assurance and residual value assurance will be provided through the communication protocol between the coin and the payment oriented computing device with which the coin will be connected.

One common way to provide assurance of mint and residual value is for the coin to be tamper resistant and communicate with the connected computing device by encrypting all outgoing data from the coin using a private key put there by the mint, to allow the computing device to read it using the corresponding published mint public key. There could be a large variety of private-public key pairs that are distributed and used according to denomination, date of minting, etc.

There are several common hardware solutions to insure that the file that holds the money bits of the digital currency is not a refill but an original mint-placed bits.

Bronze coins require no assurance, they simply serve as bit money container, and the validity of the money will have to be ascertained outside the coin.

Construction Technology

Figure 2:
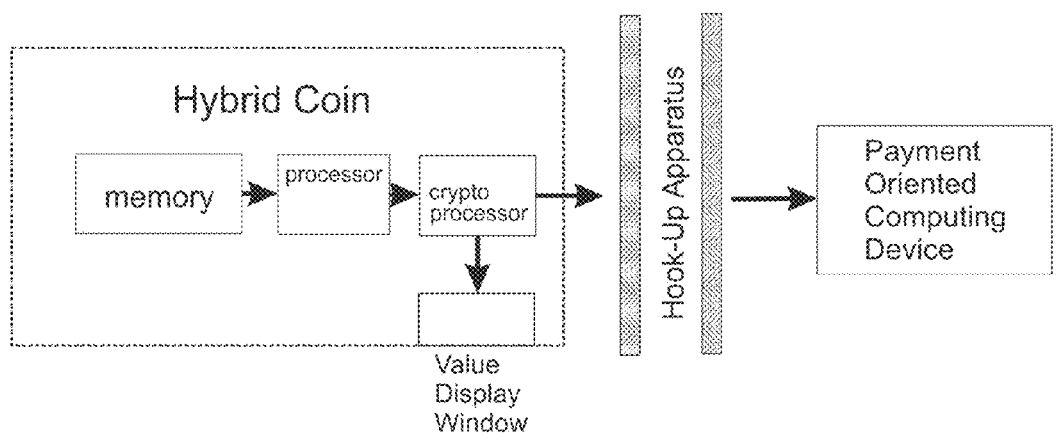

Construction Technology will be discussed by topics:
circuitry
power options
Hook-up technology
shape, size and form Circuitry The basic circuitry of the hybrid coin may be comprised of the following functions: memory—where the digital money is housed, a processing unit that reads/writes into the memory and optionally erases parts thereof, a value display unit that is connected to the processing unit, a crypto processor that is connected to the processing unit on one hand and to a hook-up apparatus on the other hand. The hook-up apparatus is connected to the payment oriented computing device that communicates with the hybrid coin. See FIG. 2. The hook-up mechanism may be touch-based, swipe based, or distance based including NFC, BLUETOOTH, INFRARED, WiFi, phone connection, etc. The latter are trademarks representing various means for communications based on modulating electromagnetic waves.

The coin comes with its coin data in memory. The memory may also include various mint data to help authenticate the coin itself. The crypto processor has a built in keys and operates through a variety of optional protocols, to help hinder counterfeiting. One such protocol is to encrypt all coin data that is processed by the processing unit and fed into the crypto processor, by the crypto processor, and send it out as a ciphertext. The payment oriented computing device over the hook-up apparatus will use the mint public key corresponding to the coin's private key, to ascertain that the coin is authentic.

Power Option

The hybrid coin can be power-less and operated only through the power of the device it is being hooked to. Or it can have a tiny built in battery only for the secondary circuitry to authenticate the mint, or it may have a built in battery to power up the silver operation for display of value, if such a window is presented (normally in the high value denomination coins), and for the dialogue with the hooked computing device. The battery could be replaceable and latched through a small slit at the side of the coin.

Hook-Up Technology

The coin could allow for one or more hookup options including touch hook up, nominally via a USB cable with the coin being equipped with a mini USB female port. Or with swipe option where the coin is being equipped with a magnetic card, or with a distance based communication, which is less secure.

Shape Size, and Form

Figure 3:
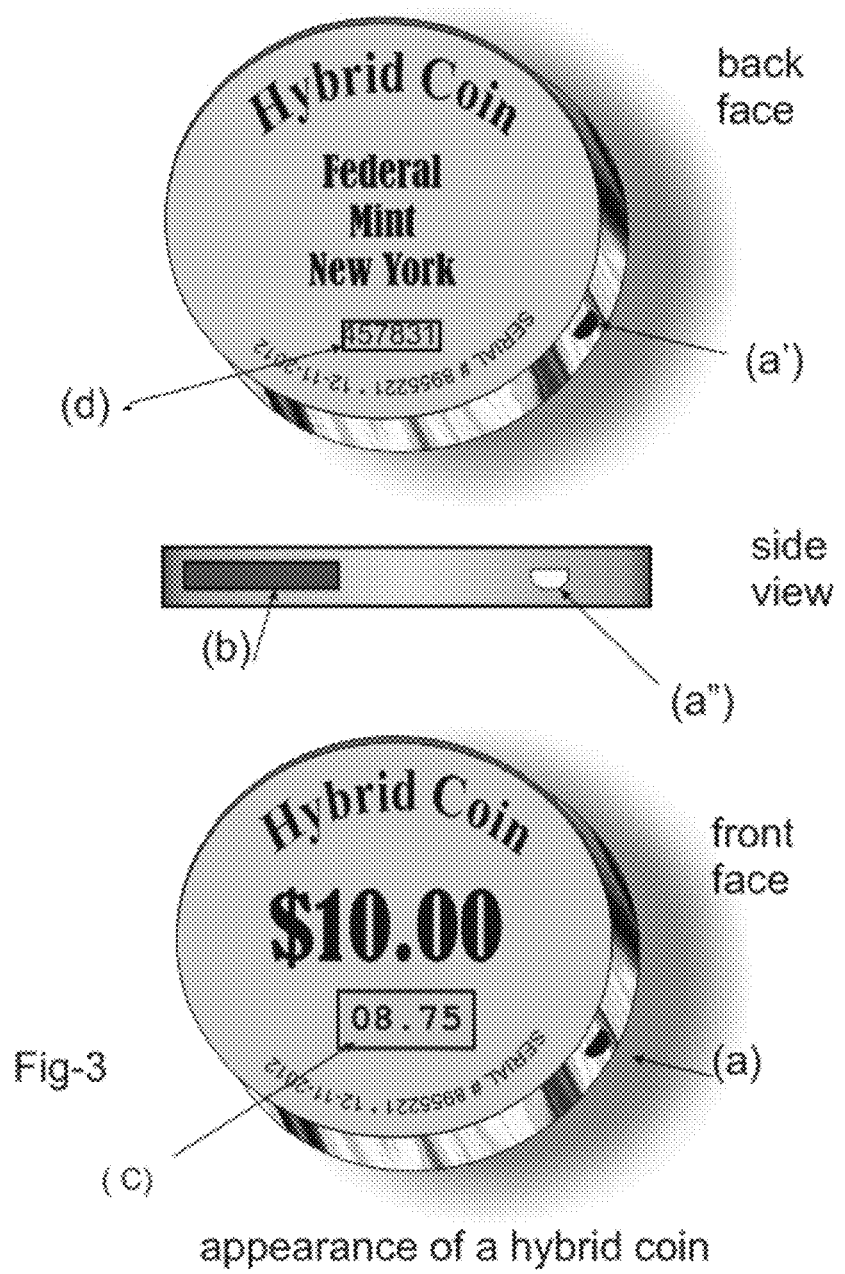

The basic hybrid coin will be round and thin, to emulate the familiar quarters or dollar coin. Its fabric will be reminiscent of a regular coin. Its edge might be jagged. See FIG. 3: items (a, a', a') represent a mini USB female port, (b) represents the covered slot for a coin battery, (c) represents the residual value display window. In the drawing it shows $8.75, indicating that the coin has lost its gold status (lost its virginity), was already partially drained (in the mount of $1.25), and the residual value of the coin is $8.75. On the back face, item (d) represents the mint-assurance window. The display on the window changes frequently as computed by the crypto processor inside the coin. That display number if computed based on a built in clock, and on the serial number of the coin, and on built-in hardware constructed cryptographic key. The recipient trader will text or otherwise communicate to the mint the serial number of the coin, and its display number, and the mint will text back whether this coin is bona fide or counterfeit because the mint will have the data in all its coins, and could follow the computation of the coin, and verify the displayed code.

Other shapes, rectangular, credit-card like will be also available. Different shapes will accommodate different options for proof of virginity and mint assurance. The round coins have the advantage of behavioral continuity.

There might be a distinction in the size of the coin based on the denomination, so that larger denomination coins will be of a larger size.

Use of Hybrid Coins

We discuss use according to the two main categories of use:
Fast cash-and-carry transactions
Emergency Use We also discuss briefly the economics of hybrid coins. On top of the expenses needed to mint the digital money per se, there will be cost for manufacturing the coins. This cost may be handled by a purchase commission computed for each denomination based on the actual cost of the coin. In special cases where a coin represents the exact fair for a ride, for example, then the train or bus authority may bear the cost of the coin, so that commuters pay only the face value. The train or bus system will save on fare handling and will find it advantageous to pay the coin commission.

Use of Fast Common Cash Transactions

We discuss fast common cash transaction use according to the following topics:
denomination shape and format
distribution
life cycle
purpose
online-offline interplay
security
power supply
coupons and non-dollar representation
Acceptability
Denomination:

We expect hybrid coins to first extend from regular coins, namely to be used in denominations starting from $1.00 to $10.00. These small denominations will require corresponding simple counterfeit technology, and hence the cost to be born to produce them will be small. These coins are expected to be long lasting before their virginity is tampered with because of their low denomination. Higher denominations will be gradually more and more in demand, as people get accustomed to these coins, and begin to trust them as carriers of value. One may envision hybrid coins denominated at various values up to $100, and even up to $1000. Of course, the higher the denomination, the more sophisticated the anti-counterfeit technology involved.

There are likely to be cases where a common service, like a train ride has a non-round cost, say $23.72. If the number of commuters is large, then riders will be invited to purchase coins denominated exactly for $23.72 cents, and hand them over or slip them in a payment slot in a fast flow through to the train. The train authorities will engage the mint, to issue gold coins for this particular amount. A rider who accumulated these coins and for some reason stopped using the train, could readily use these coin for any other payment need, or he or she will be able to break the virginity of the coin, and upload its contents ($23.72) to their phone or PC for regular use.

Shape and Format

Figure 4:
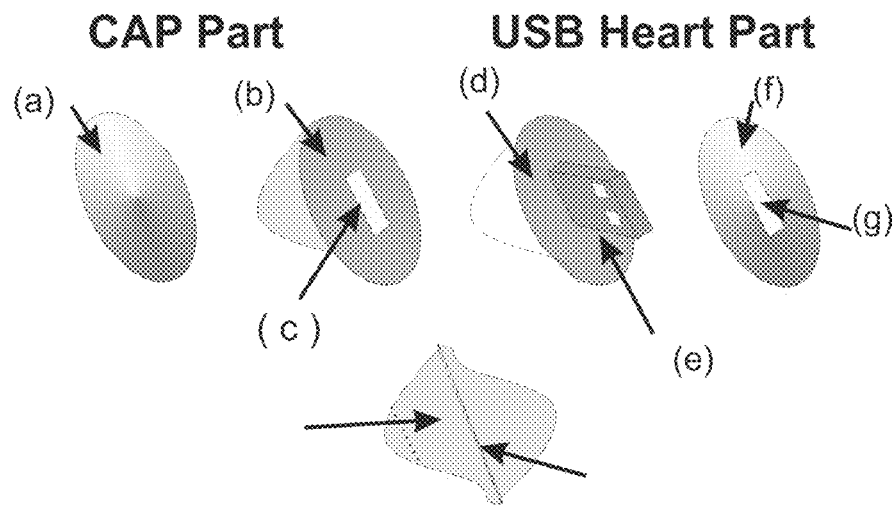
Figure 4:
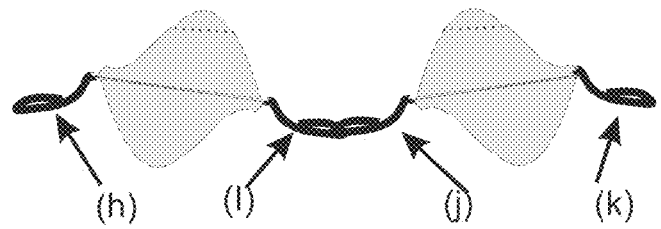
Figure 4:
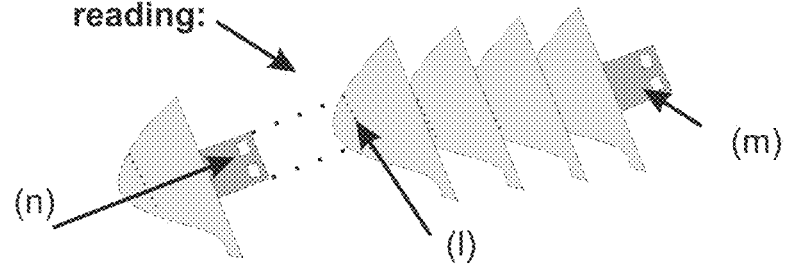
Figure 5:
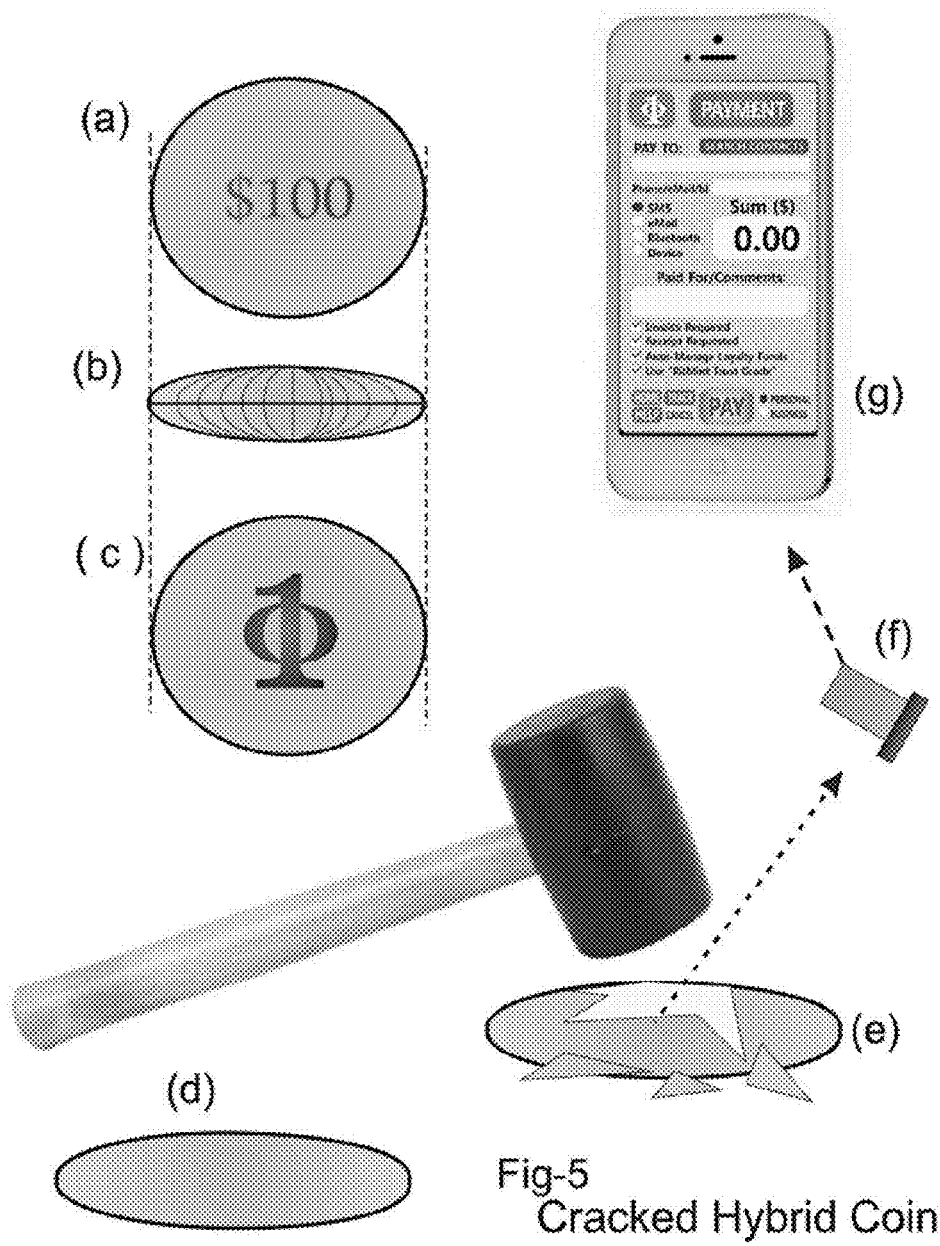

To extrapolate from present day nominal coins, one will opt for similar round shape and size, and such will be easier to accept and accommodate. But for reasons of storage, counting and otherwise, one can envision a variety of shapes and format. See for example the nut option (FIG. 4). Of particular interest are the flat, card-like coins: they will serve as an extrapolation of the familiar credit card. We have on-card flat chip technology that could accommodate the hybrid coins. Credit-card like coins will have the advantage of a large surface area that can be used for branding, for colorful text and graphics for advertising purposes, etc.

Distribution

Because hybrid coins are meant to be easily transferable, they are naturally un-tethered to a particular owner, and if lost, anyone could find and use them. Same for theft and robbery. So much as people are reluctant to hold and be in possession of large number of cash, so they would not wish to hold a large quantity of hybrid coins. People will stuff their wallets, their glove compartment, their desk with a small amount of money in small denominations, and would probably opt for gold coins that are the easiest one to trade, and command the greatest measure of trust. Traders will get these coins in their bank; they will exchange coins in stores, and they will buy coins in automatic kiosks where they will pay with their credit card, or old fashioned cash, and receive the coins.

Life-Cycle

The hybrid coin is minted as a 'gold coin'—virgin, pristine, and it may transact indefinitely as 'gold'. At some point the gold coin is either returned to the mint for redemption, or it turns into a 'silver coin' namely a coin that has lost its virginity, and has been partially drained, which means some of its digital value has been removed from it. The silver coin may be traded as silver in which case the authenticity and the integrity of the coin is maintained by the coin valuation mechanism that keeps track over how much of the original value of the coin is still in it. For example, if a coin was minted as 'gold' in a $25.00 denomination, then after being traded as virgin, gold $25.00 coin, it is eventually 'opened' and $7.00 are paid off through the coin drainage mechanism, leaving the value of the coin at $18.00, with status 'silver'. The silver coin may be traded about for its current face value of $18.00, and the payee will trust first the mint the issued the respective gold coin, and second, the value tracking mechanism within the coin that assures the recipient payee that he indeed receives a payment of $18.00. Eventually one of four things happens: (1) the silver coin is handed back to the mint for redemption, (2) the silver coin is drained to residual value of $0.00 and discarded, (3) the silver coin is rendered into a bronze coin, namely some non-Mint source of digital money pumps digital money into it and the residual tracking mechanism reflects this. The coin can then start to drain again, or it may be redeemed at the mint, or it may be re-pumped and re-used as above indefinitely. (4) the coin is lost, abandoned, it breaks down physically either by a blow, or by a strong force, or by getting excessively wet, or by some chemical interaction, or otherwise. Please note that if the coin is stolen, it can still be used unless it has proper security feature. Regular hybrid coins are presumed to be owned by their holder.

Purpose

The main purpose for hybrid coins is the desire to conclude a simple ordinary transaction with minimum of hassle and complexity. When you pick a daily paper at the counter, it's too much to pull out your phone hit a series of buttons, or slide the screen here and there. The newspaper may cost $2.50, and you wish to be able to pull a coin from your pocket, flip it over to the seller, pick your copy and move on. A $2.50 gold coin will be perfect for this use. The anonymity that is inherent to this use is another purpose, even for more expensive deals. You want to buy books without 'big brother' watching you and profiling you based on the books your buy or the movies you watch, or the food you eat, so paying with modern cash—hybrid coins seem a suitable satisfactory solution. Hybrid coins may prove useful in an Internet cafe and otherwise for online purposes. Of course in this use the gold coin must be broken-in, and used as a reservoir of bit money. One would expect Internet Cafe operators to hold a supply of hybrid coins for customers, who may even buy them with credit card, counting on the hope that the cafe owner is not keeping tab of which coin went to which customer. A third purpose is to avoid the burden of carrying a heavy load of regular cash in your pocket. Hybrid coins may carry a large denomination on a single coin, which is not feasible with regular coins. A fourth purpose is to avoid currency exchange when you cross a national border. The bits are usable online from any place, from any location. And so even local brick and mortar stores who may not legally and conveniently accept dollars in a foreign country, will gladly accept bit representation of dollars because it is tradable all over.

A special purpose of the hybrid coin will be as a silver category over-distance payment. See below.

Online-Offline Interplay

It seems essentials to be able to shift from online mode to offline mode and vice versa in a seamless way. Using bronze coins a trader could replenish his original coin but decrease its security and therefore make the trade with the coin a bit more cumbersome as the recipient needs to verify the paid coin. Every coin may be opened, broken-into, (disrupting its virginity), and its content may be streamed into any phone, pc, or otherwise an electronic container from where this money can be used in any online application. So bronze coin trading allows for a back and forth flow of bits without any limitation. When trade is limited to gold and silver coins then the flow of hybrid coin money is only one way: towards the online use.

Security

Security of gold coins may be assured by simple visual inspection, or by use of some authentication technology to be applied to the coin. Coins of low denominations will be inspected quickly and visually, but coins of high denominations might attract more scrutiny, and the payee may wish to use a verifier device before he or she is convinced of the gold status of the coin. Silver coins may be trusted by the coin declaring itself silver and proclaiming the value of the residual money in it. But one might expect some payee being extra cautious, especially for coins of large denominations: they will wish to authenticate the coin contents at the mint. To do that they will have to connect the silver coin to a phone or a PC. Of course "live hybrid coins" that are continuously connected to the mint are an easier option.

Power Supply

Gold coins may not require any power supply, but silver and bronze coins may be needing a power source to operate. The power may be coming partly from an outside source to which the coin is connected. In that case the silver and bronze coins will be blind—showing no indication as to how much money is left and even not as to their status, silver or bronze. They will have all that data in their 'blind memory' and when connected to a phone a PC or any other well powered computing device their data will be read and displayed on the connecting device. Otherwise silver and bronze coins may operate with a battery that would power the computation needed for it status determination (silver or bronze) and for computing its residual digital money. Power is also needed to display the residual money value and its status. The battery that supplies this power may be built in, and its power rated to be sufficient for the expected life time of the coin. If the built-in battery dies, the coin can be returned to the mint for replacement. Otherwise the battery may be snapped in and out, and easily replaced.

Coupons and Non-Dollar Representation

The hybrid coins may be issued to represent value other than US dollar or other national currency. Much as digital money may reflect any valuable, so is the case for hybrid coins. So hybrid coins may represent discount money in selected store, or money that is tied for a purpose, say food. One might find the coin-like appearance of the hybrid coin more appealing than the traditional cards or printed rolls of paper.

Acceptability

Acceptability of hybrid coins will probably be tied to the acceptability of the underlying digital money, and will be much appreciated as an extension thereto.

Over-Distance Payment Use Options:

Silver coins fitted with over-distance payment options may find a variety of important use cases. Over-distance payment may be carried out via NFC, BLUETOOTH, IR, or any other electromagnetic radiation regimen. Payment will be possible as an alternative to physical hook-up or swipe option, but also for new uses. For example an over-distance silver coin could replace today 'Easy-Pass'—the payment devices that are attached to the windshield and communicate with road-side or road-top readers to accomplish a toll payment for a tall road, for example. A silver coin will use the over-distance technology to actually send over the money owed, as a cash transfer, instead of accounting data for a future payment. Drivers would like this, because these silver coins can be purchased everywhere, and because drivers would be able to make a payment but maintain their anonymity.

Movie goers will be able to put in their shirt pocket an over-distance payment silver coin, and never stand in line to buy a ticket, but rather walk directly to the theatre, a door-placed reader will extract the ticket amount as they walk in.

In a restaurant a diner will place a silver coin on the table, and the waiter will point to it a hand held payment extractor, and get paid.

Parking may be paid by simply displaying the silver coin on the dashboard. Every parking stop will have a distant money reader instead of the old fashioned money collector.

A special case of over distance payment refers to internet live, or phone connection, which allows for coin verification in real time, and long distance coin payment.

Hybrid Coins Use in Emergency Payment Circumstances

We consider two categories of emergencies:

Networks Emergency

Liquidity Emergency

The former refers to a situation where the global or zone connectivity is disrupted, the cloud collapses, connection with the mint or its agencies is broken, and normal network enabled communication are not feasible. The latter case refers to a crisis or a disaster situation where the banks are dysfunctional, people cannot retrieve and activate their money assets, and the area is hard hit by an earthquake a powerful storm, flood, or snowfall, or perhaps a terrorist act. Areas of urban populations present a big challenge to the rescue operation and a lot depends on mutual help. Yet, one cannot expect a gas station owner to pump gas to his customers and rely on them showing up to pay for the gas when the flood is over. Cash money activates the community and allows for useful trade to help resolve the situation.

Networks emergency can clearly be helped by trading gold coins, but also by trading silver coins where the coin is battery operated, and so is the recipient of the money bits, if they are transferred to him or her. One prepares for such emergency with plenty of stored batteries.

Liquidity emergency may be handled by the disaster management authority (DMA) by distributing gold hybrid coins to the suffering population. A proper distribution of denomination previously prepared by the DMA will greatly alleviate the situation. People will then be able to trade these coin in a silver status, using the accompanied supply of batteries. This situation calls for preparation of active digital coins to be so distributed. Another, more sophisticated way to handle payment regimen in a crisis situation is to use hybrid coins of crisis money. Crisis money is money that comes alive when a disaster happens, and it fades away after the disaster is over.

Hybrid Coins for Crisis Money:

Payment requirement in a crisis situation may be handled by using ephemeral money. Ephemeral money is money that appears at a given moment—out of thin air, and at a subsequent moment it vanishes into complete disappearance. Between this birth and death points the money is active, traceable and satisfies a requirement set upon it. In general ephemeral money may vanish in a way that its holder is simply losing it. In that case the purpose of the ephemeral money is to effect some lasting changes during its live time, but the trade is such that whoever is left with it at its vanishing point, is losing its value without compensation. Such ephemeral money is used in money games and game-trades designed for digital money. But for crisis management the planned ephemeral money will be traded against some form of lasting money so that the holder of ephemeral money will end up with an equivalent or corresponding amount of durable, and lasting money.

Ephemeral money may be traded in a form of digital money prepared in hybrid coins which may or may not be distributed ahead of time. Unlike nominal money, ephemeral money is of no value until the proper authority announces its "birth". So unlike regular money the people who receive it to prepare for a pending crisis cannot use it before its birth date, and so it will be available to them when the crisis hits. If the ephemeral money in hybrid coins is distributed through a proper range of denominations with a proper amount of coins then the coins can be traded as 'gold' which is the least time consuming under the duress of the crisis. Otherwise, using battery operated devices, if necessary, the people affected by the crisis will be using silver coins for their trade.

When the crisis is over the ephemeral money may be traded against nominal money under some exchange protocol. This is important for the people to be willing to accept the ephemeral money. The crisis management authority may deduct the value of the originally distributed ephemeral money from any amount of ephemeral money that people will submit for redemption. If people in the crisis zone will end up with less money than they were given then per an authoritative decision, either the shortfall will be forgiven or it will become debt to the government. Either way the ephemeral money will relieve the banks from the requirement to struggle to remain open despite the crisis, and at the same time it will allow the many strangers in the disaster zone to cooperate and collaborate in ways that would encourage many to work their hardest, and be recognize for their efforts.

What is claimed is:

1. An apparatus for storing a digital coin, comprising:
    a non-transitory computer readable medium that contains a digital coin;
    a tamper proof housing that encloses the non-transitory computer readable medium and is made of such a material so that when the housing is opened to obtain the non-transitory computer readable medium and read the digital coin the tamper proof housing cannot be returned to its virgin condition;
    the digital coin containing visible markings of the digital coin's nominal value and the identity of its mint; and
    wherein the digital coin is marked with a dynamic identification code that changes at given time intervals based on cryptographic protocols, allowing the digital coin holder to contact the mint that minted the digital coin to verify its authenticity and viability;
    track digital coin history for the digital coin wherein the dynamic identification code of value-indicating bits are randomly determined by the mint that minted the digital coin;
    wherein the digital coin holder redeems the digital coin by presenting the dynamic identification code of the value-indicating bits: few of the digital coin's representative bits within the coin are masked by the payer unbeknownst to a payee (the digital coin still appears random) such that the mint upon inspecting the digital coin submitted for redemption will authenticate the digital coin on account of the identity using the digital coin's bits, including the masked bits which the mint detects;
    wherein the masked bits are editing binary code for history tracking; and
    wherein the payee trades the digital coin to a third trader, and similarly masks a few bits, and so on, trader to next trader; the identities of the various masked bits will indicate to the mint who owned the digital coin.

2. The apparatus of claim 1, wherein the tamper proof housing is comprised of a scratchable pad such that the money value of the digital coin is visible by scratching the pad, in which case it can no longer be passed around as a "virgin", unexposed digital coin.

3. The apparatus of claim 1, wherein the tamper proof housing is comprised of plastic such that a blow designed to crack it will cause the housing to break along a breaking line in which case the digital coin can no longer be passed around as a "virgin", unexposed digital coin.

4. The apparatus of claim 1, wherein the tamper proof housing is comprised of material and shape reminiscent of regular coins, like a quarter, or a dollar coin, including a jagged edge.

5. The apparatus of claim 1, wherein the tamper proof housing is comprised of any of the variety of ways used to insure virginity of over-the-counter drugs, like sheer tearable plastic wrappers, such than when the wrapper is torn the digital coin can no longer be passed around as a "virgin", unexposed coin.

6. The apparatus of claim 1, wherein the digital coin is rectangular in shape, resembling the familiar credit card, and where the digital coin data is held in on-card flat-chip technology.

7. The apparatus of claim 1, wherein the digital coin's size will reflect its nominal value to help prevent counting errors, and make it easy to visually compute the total value of a number of coins.

8. The apparatus of claim 1, wherein the digital coin's value reflects the cost of a common transaction, like a bus or metro ride, such that admission is granted against passing the digital coin, expediting admission for large crowds.

9. The apparatus of claim 1, wherein the digital coin is marked with an identification code (e.g. serial number, minting date) allowing its holder to contact the mint that minted the digital coin to verify its authenticity and viability.

* * * * *